US012578082B2

(12) United States Patent
Ji et al.

(10) Patent No.: US 12,578,082 B2
(45) Date of Patent: Mar. 17, 2026

(54) LIGHT-EMITTING SUBSTRATE, LIGHT-EMITTING APPARATUS AND LIGHTING APPARATUS

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Fengli Ji, Beijing (CN); Chengjie Qin, Beijing (CN); Zhenli Zhou, Beijing (CN); Hongjun Zhou, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/547,689

(22) PCT Filed: Nov. 1, 2022

(86) PCT No.: PCT/CN2022/128879

§ 371 (c)(1),
(2) Date: Aug. 23, 2023

(87) PCT Pub. No.: WO2024/092483

PCT Pub. Date: May 10, 2024

(65) Prior Publication Data

US 2025/0003577 A1 Jan. 2, 2025

(51) Int. Cl.

*F21V 19/00* (2006.01)
*F21V 3/00* (2015.01)

(Continued)

(52) U.S. Cl.

CPC ............ *F21V 19/0015* (2013.01); *F21V 3/00* (2013.01); *F21Y 2105/18* (2016.08); *F21Y 2113/00* (2013.01); *F21Y 2115/15* (2016.08)

(58) Field of Classification Search

CPC .... F21V 19/0015; F21V 3/00; F21Y 2105/18; F21Y 2113/00; F21Y 2115/15

See application file for complete search history.

(56) References Cited

U.S. PATENT DOCUMENTS 10,199,442 B1 2/2019 Zhang et al.
10,665,641 B2 5/2020 Wang (Continued)

FOREIGN PATENT DOCUMENTS

CN 105609663 A 5/2016
CN 106910841 A 6/2017

(Continued)

OTHER PUBLICATIONS

CN 108550602 A machine translation (Year: 2018).*

(Continued)

*Primary Examiner* — James R Greece
*Assistant Examiner* — Jose M Diaz
(74) *Attorney, Agent, or Firm* — Kinney & Lange, P.A.

(57) ABSTRACT

The present disclosure provides a light-emitting substrate, a light-emitting apparatus and a lighting apparatus. The light-emitting substrate includes: a base substrate including a plurality of light-emitting regions and a plurality of non-light-emitting regions, where the plurality of light-emitting regions are arranged in an array; a plurality of light-emitting units located in the plurality of light-emitting regions, respectively, where in each light-emitting region, more than one light-emitting unit is arranged in an array; a covering layer covering the light-emitting region and the non-light-emitting region; and a plurality of support structures (Continued)

arranged in an array and evenly distributed in the plurality of non-light-emitting regions and/or between the plurality of light-emitting units, where the support structures are used to support the covering layer.

17 Claims, 15 Drawing Sheets

(51) Int. Cl.

| | |
|---|---|
| ***F21Y 105/18*** | (2016.01) |
| ***F21Y 113/00*** | (2016.01) |
| ***F21Y 115/15*** | (2016.01) |

(56) References Cited

U.S. PATENT DOCUMENTS

| | | | | |
|---|---|---|---|---|
| 2019/0027543 | A1 | 1/2019 | Zhang et al. | |
| 2019/0280049 | A1 | 9/2019 | Wang | |
| 2020/0219950 | A1 | 7/2020 | Huang et al. | |
| 2024/0023376 | A1 | 1/2024 | Cao | |
| 2024/0276779 | A1* | 8/2024 | Xu ..................... | H10K 59/1315 |

FOREIGN PATENT DOCUMENTS

| | | | |
|---|---|---|---|
| CN | 107331791 | A | 11/2017 |
| CN | 108550602 | A | 9/2018 |
| CN | 109065596 | A | 12/2018 |
| CN | 109192755 | A | 1/2019 |
| CN | 112349760 | A | 2/2021 |
| CN | 113013222 | A | 6/2021 |
| CN | 113540197 | A | 10/2021 |
| CN | 113675353 | A | 11/2021 |
| CN | 114023798 | A | 2/2022 |
| CN | 216084892 | U | 3/2022 |
| JP | 2004086121 | A | 3/2004 |
| KR | 20060056811 | A | 5/2006 |

OTHER PUBLICATIONS

CN113013222A machine translation (Year: 2021).*
International Search Report and Written Opinion dated Jul. 29, 2023, for corresponding PCT Application No. PCT/CN2022/128879.
Extended European Search Report dated May 15, 2025, for corresponding European Patent Application No. 22963802.8/1211, 11 pgs.

* cited by examiner

LIGHT-EMITTING SUBSTRATE, LIGHT-EMITTING APPARATUS AND LIGHTING APPARATUS

CROSS-REFERENCE TO RELATED APPLICATION

This application is a Section 371 National Stage Application of International Application No. PCT/CN2022/128879, filed Nov. 1, 2022, entitled "LIGHT-EMITTING SUBSTRATE, LIGHT-EMITTING APPARATUS AND LIGHTING APPARATUS", which is incorporated herein by reference in its entirety.

TECHNICAL FIELD

The present disclosure relates to a field of a lighting technology, in particular, to a light-emitting substrate, a light-emitting apparatus and a lighting apparatus.

BACKGROUND

An OLED (organic light-emitting diode) is a current driving type organic light-emitting device, which has advantages of low energy consumption and high brightness. The OLED may be applied to a display field or a lighting field. For the above-mentioned light-emitting device, during encapsulation, a light-emitting unit in the light-emitting region may suffer a scratching when there is insufficient or non-uniform support for the encapsulation material for a light-emitting region, which may cause a light-emitting failure and affect a display effect or lighting effect. In addition, problems of poor display or poor lighting, such as Newton's rings, caused by light diffraction generated by the light-emitting device due to a deformation of the encapsulation material may exist.

SUMMARY

In order to solve at least one aspect of the above-mentioned problems, embodiments of the present disclosure provide a light-emitting substrate, a light-emitting apparatus and a lighting apparatus.

In an aspect, there is provided a light-emitting substrate, including: a base substrate including a plurality of light-emitting regions and a plurality of non-light-emitting regions, where the plurality of light-emitting regions are arranged in an array, and at least one of the non-light-emitting regions is located between the light-emitting regions; a plurality of light-emitting units located in the plurality of light-emitting regions respectively, where in each light-emitting region, more than one light-emitting unit is arranged in an array; a pixel defining layer including a plurality of openings; and a plurality of support structures disposed on a side of the pixel defining layer away from the base substrate, where the plurality of support structures are arranged in an array, and are distributed in the plurality of non-light-emitting regions and between the more than one light-emitting unit.

In some exemplary embodiments of the present disclosure, the plurality of support structures include a plurality of first support portions in the non-light-emitting region; and the plurality of first support portions are arranged into a plurality of rows, and each row of first support portions are arranged in a shape identical to a shape of an edge of the light-emitting region.

In some exemplary embodiments of the present disclosure, the light-emitting region includes a plurality of side edges, and edges of the plurality of side edges are in straight lines. More than one first support portion between side edges of two adjacent light-emitting regions is arranged in a shape of a straight line parallel to the side edge.

In some exemplary embodiments of the present disclosure, the first support portions in adjacent rows are alternately arranged in a row direction, and orthographic projections of the first support portions in the adjacent rows in a direction parallel to the row direction do not overlap with each other.

In some exemplary embodiments of the present disclosure, the light-emitting region includes a curved side edge, and each row of first support portions among more than one row of first support portions at a periphery of each light-emitting region are arranged in a curve identical to a curve of the curved side edge.

In some exemplary embodiments of the present disclosure, a first section of the first support portion in a plane parallel to a plane in which an upper surface of the base substrate is located is in a shape of a square, and a side length of the square is in a range of 5 microns to 60 microns.

In some exemplary embodiments of the present disclosure, the first section is in a shape of a rectangle, and a length direction of the rectangle is parallel to a side edge of the light-emitting region.

In some exemplary embodiments of the present disclosure, the length of the rectangle is in a range of 5 microns to 60 microns, and the width of the rectangle is in a range of 3 microns to 20 microns.

In some exemplary embodiments of the present disclosure, the plurality of support structures include a plurality of second support portions, and the plurality of second support portions are between the more than one light-emitting unit in the light-emitting region. The plurality of second support portions are arranged into one row between adjacent light-emitting units, and the one row of second support portions is arranged in a direction parallel to an edge direction of an opening of the pixel defining layer, where the opening corresponds to the light-emitting unit.

In some exemplary embodiments of the present disclosure, the second support portions include a side edge support portion disposed between adjacent side edges of two adjacent light-emitting units.

In some exemplary embodiments of the present disclosure, a second section of the side edge support portion in a plane parallel to a plane in which an upper surface of the base substrate is located is in a shape of a rectangle.

In some exemplary embodiments of the present disclosure, more than one side edge support portion is provided between adjacent side edges of two light-emitting units, and a length of the rectangle is in a range of 5 microns to 60 microns, and a width of the rectangle is in a range of 3 microns to 20 microns.

In some exemplary embodiments of the present disclosure, one side edge support portion is provided between adjacent edges of two light-emitting units, and a length of the rectangle is in a range of 20 microns to 300 microns, and a width of the rectangle is in a range of 3 microns to 30 microns.

In some exemplary embodiments of the present disclosure, the second support portions include a vertex support portion disposed between adjacent vertices of four adjacent light-emitting units.

In some exemplary embodiments of the present disclosure, among the four adjacent light-emitting units, the vertices of light-emitting units opposite to each other have a same distance to the vertex support portion.

In some exemplary embodiments of the present disclosure, the vertex support portion has a length direction and a width direction, in the length direction, a distance from the vertex support portion to the vertex of the light-emitting unit is in a range of 3 microns to 30 microns, and in the width direction, a distance from the vertex support portion to the vertex of the light-emitting unit is in a range of 2 microns to 20 microns.

In some exemplary embodiments of the present disclosure, a third section of the vertex support portion in a plane parallel to a plane in which an upper surface of the base substrate is located is in a shape of an axisymmetric figure, and a symmetry axis of the axisymmetric figure is a line connecting adjacent vertices of two adjacent and opposite light-emitting units.

In some exemplary embodiments of the present disclosure, the light-emitting substrate further includes: a covering layer covering the light-emitting region and the non-light-emitting region, where at least a part of the covering layer is supported by the plurality of support structures.

In some exemplary embodiments of the present disclosure, the light-emitting substrate further includes: an anode disposed on the base substrate, where a layer in which the anode is located is on a side of the pixel defining layer close to the base substrate; a driver circuit disposed on the base substrate, where a layer in which the driver circuit is located is on a side of the layer in which the anode is located close to the base substrate; and an anode connecting hole, where the anode is electrically connected to a driver circuit corresponding to the anode through the anode connecting hole. An orthographic projection of the anode connecting hole on the base substrate falls within an orthographic projection of the pixel defining layer on the base substrate, and the orthographic projection of the anode connecting hole on the base substrate is spaced apart from an orthographic projection of the support structure on the base substrate.

In some exemplary embodiments of the present disclosure, a plurality of support structures are spaced apart from each other and distributed between anode connecting holes of two adjacent light-emitting units.

In another aspect, there is provided a light-emitting apparatus including the light-emitting substrate as described above.

In another aspect, there is provided a lighting apparatus including the light-emitting substrate as described above or the light-emitting apparatus as described above.

BRIEF DESCRIPTION OF THE DRAWINGS

Other objectives and advantages of the present disclosure will be apparent through the following descriptions of the present disclosure with reference to the accompanying drawings, in order to provide a comprehensive understanding of the present disclosure.

Figure 1:
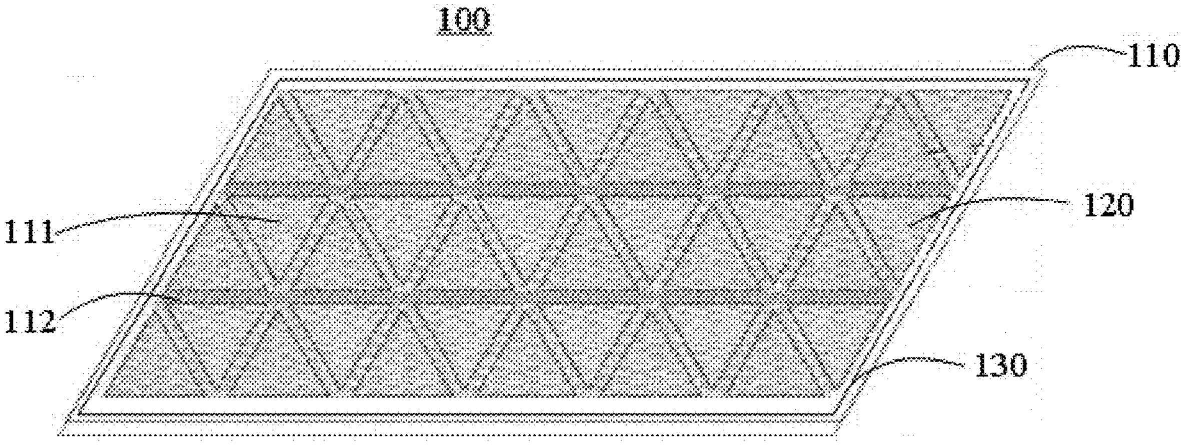
FIG. 1 shows a schematic top view of a light-emitting substrate according to an embodiment of the present disclosure.

It will be noted that, for the sake of clarity, in the accompanying drawings used to describe embodiments of the present disclosure, dimensions of layers, structures or regions may be enlarged or reduced, that is, the accompanying drawings are not drawn to actual scale.

DETAILED DESCRIPTION OF EMBODIMENTS

The technical solutions of the present disclosure will be further described in detail through the following embodiments with reference to accompanying drawings. In the specification, the same or similar reference numerals indicate the same or similar components. The following descriptions of embodiments of the present disclosure with reference to the accompanying drawings are intended to explain the general invention concept of the present disclosure and should not be construed as limiting the present disclosure.

In addition, in the following detailed descriptions, for the convenience of explanation, many specific details are set forth to provide a comprehensive understanding of the embodiments of the present disclosure. However, it may be apparent that one or more embodiments may be implemented without these specific details.

It will be noted that although terms "first", "second", etc. may be used here to describe various parts, components, elements, regions, layers and/or portions, the parts, components, elements, regions, layers and/or portions should not be limited by the terms. Instead, the terms are used to distinguish a part, component, element, region, layer and/or portion from another. Therefore, for example, a first component, a first component, a first element, a first region, a first layer and/or a first portion discussed below may be referred to as a second component, a second component, a second element, a second region, a second layer and/or a second portion without departing from the teaching of the present disclosure.

For the convenience of description, spatial relationship terms, such as "up", "down", "left", "right", etc., may be used here to describe a relationship between an element or feature and another element or feature as shown in the drawings. It will be understood that the spatial relationship terms are intended to cover other different orientations of an apparatus in use or operation other than those described in the drawings. For example, when the apparatus in the drawings is reversed, an element described to be located "under" or "below" another element or feature may be oriented to be located "on" or "above" the another element or feature.

Terms "substantially", "approximately", "approximately", "roughly" and other similar terms used herein are used as approximate terms rather than as degree terms, and they are intended to explain the inherent deviation of measured values or calculated values that will be recognized by those skilled in the art. In consideration of factors such as process fluctuation, measurement problems and errors related to the measurement of a specific quantity (i.e., limitations of the measurement system), "approximately" or "approximately" as used herein includes the stated value and indicates that the specific value determined by those skilled in the art is within an acceptable deviation range. For example, "approximately" may mean that a value is within one or more standard deviations, or within 30%, 20%, 10%, and 5% of the stated value.

It will be noted that a term "same layer" refers to a layer structure formed by forming a film layer for formation of a specific pattern through a same film forming process, and then performing a patterning process on the film layer using a mask. According to different specific patterns, a patterning process may include a plurality of exposure, development or etching processes. The specific patterns in the formed layer structure may be continuous or discontinuous. That is, a plurality of elements, parts, structures and/or portions located in the same layer are made of the same material and formed by the same patterning process. Generally, the plurality of elements, parts, structures and/or portions located in the same layer have approximately the same thickness.

It will be understood by those skilled in the art that, unless otherwise specified, "continuous extension", "integral structure", "overall structure" or similar terms mean that: a plurality of elements, parts, structures and/or portions are located in the same layer and are usually formed by the same patterning process in a manufacturing process, and no gap or break exists between the elements, parts, structures and/or portions, which is a continuously extending structure.

Directional terms "first direction" and "second direction" used herein are used to describe different directions along a pixel region, for example, a longitudinal direction of the pixel region and a lateral direction of the pixel region. It should be understood that such description is only an exemplary description, and is not intended to limit the present disclosure.

A term "a plurality of rows" used herein refers to a plurality of arrangements with a same arrangement shape and a same spacing. Each row may be a straight-line arrangement or a curved-line arrangement, and a spacing between each row among the plurality of rows is the same.

In the related art, the light-emitting device using OLED includes a light-emitting region and a non-light-emitting region. In the solution that the light-emitting device using OLED is used for display or lighting, a surface of the light-emitting device is provided with a transparent covering material to package a light-emitting unit in the light-emitting device, which may prevent the light-emitting unit from being damaged. However, in a packaging process, when the covering material for packaging the light-emitting device is deformed, a scratch between the covering material and components in the light-emitting unit may be caused, resulting in a failure of the light-emitting unit. In addition, when the covering material is deformed, a diffraction of light at different positions may occur when the light passes through the covering material, so that adverse effects such as Newton's rings, etc. may be generated on the surface of the light-emitting device, especially when the light-emitting device is used for display or lighting, which may affect a specific application effect thereof.

In order to solve the above-mentioned problems, the present disclosure provides a light-emitting substrate. The light-emitting substrate includes, but is not limited to: a base substrate including a plurality of light-emitting regions and a plurality of non-light-emitting regions, where the plurality of light-emitting regions are arranged in an array, and at least one of the non-light-emitting regions is located between the light-emitting regions; a plurality of light-emitting units respectively located in the plurality of light-emitting regions, where in each light-emitting region, more than one light-emitting unit is arranged in an array; a pixel defining layer including a plurality of openings; and a plurality of support structures disposed on a side of the pixel defining layer away from the base substrate, where the plurality of support structures are arranged in an array and distributed in the plurality of non-light-emitting regions and between the plurality of light-emitting units.

In the light-emitting substrate according to embodiments of the present disclosure, the support structures are distributed in the non-light-emitting region and between the plurality of light-emitting units. The support structure may be used to support a material on a side of the support structure away from the base substrate, so as to prevent a material on an upper side of the light-emitting unit from deforming in a direction perpendicular to an upper surface of a plane in which the base substrate is located, which may at least prevent undesirable problems such as Newton's rings, generated by the light-emitting substrate.

A structure of the light-emitting substrate according to the embodiments of the present disclosure will be described below in detail with reference to FIG. 1 to FIG. 10B.

Figure 2A:
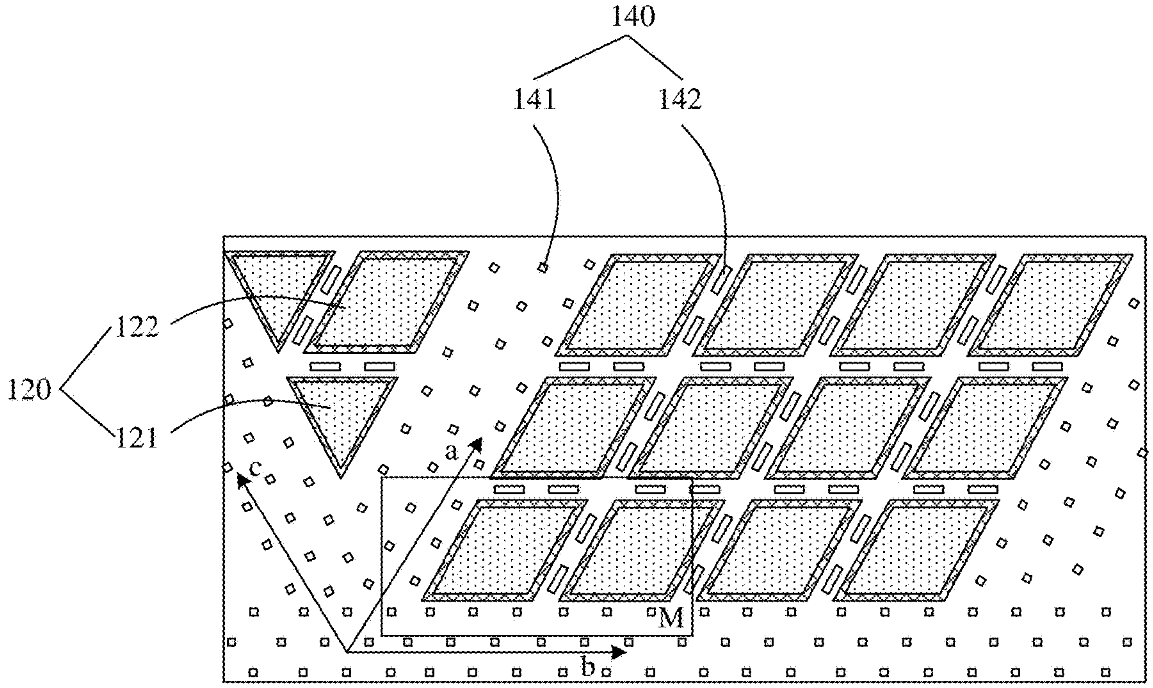
FIG. 2A shows a schematic diagram of a distribution of support structures in a light-emitting substrate according to an embodiment of the present disclosure.
Figure 2B:
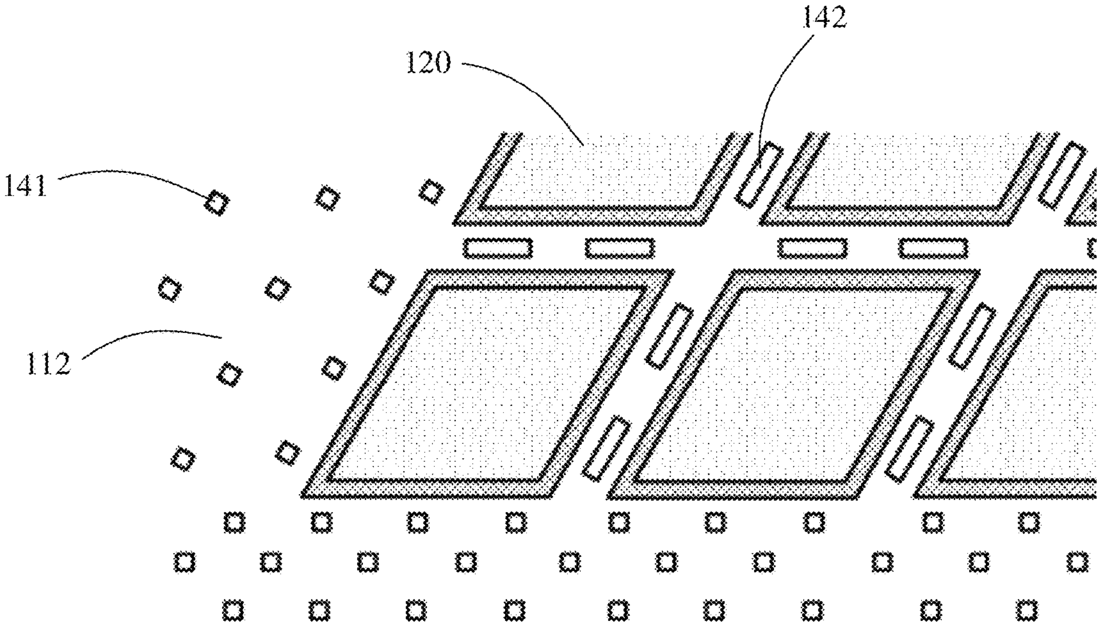
FIG. 2B shows a partial enlarged view of the region M in FIG. 2A.

FIG. 1 shows a schematic top view of a light-emitting substrate according to an embodiment of the present disclosure. FIG. 2A shows a schematic diagram of a distribution of support structures in a light-emitting substrate according to an embodiment of the present disclosure. FIG. 2B shows a partial enlarged view of the region M in FIG. 2A.

As shown in FIG. 1 to FIG. 2B, a light-emitting substrate 100 includes a base substrate 110, a plurality of light-emitting units 120, a pixel defining layer, a covering layer 130 and a plurality of support structures 140.

The base substrate 110 may be, for example, a glass substrate or a substrate made of other materials. The base substrate 110 is used to form the light-emitting unit on the base substrate.

For example, as shown in FIG. 1, the base substrate 110 includes a plurality of light-emitting regions 111 and a plurality of non-light-emitting regions 112, and the light-emitting regions 111 are arranged in an array. Each light-emitting region 111 may be in a shape of an equilateral triangle, the light-emitting regions 111 in the shape of the equilateral triangle may be arranged into an array structure by using different arrangement methods, and the non-light-emitting regions 112 are located between the light-emitting regions 111 arranged into the array structure.

In the embodiments of the present disclosure, more than one light-emitting unit is provided in each of the plurality of light-emitting regions on the base substrate, and the more than one light-emitting unit in each light-emitting region is arranged in an array.

As shown in FIG. 2A, each light-emitting region 111 includes a light-emitting unit 120 in a shape of a parallelogram and/or a light-emitting unit 120 in a shape of a triangle, for example, the light-emitting units 120 includes a triangular light-emitting unit 121 and a parallelogram-shaped light-emitting unit 122. Each light-emitting unit 120 may be used to emit light of one color. In such embodiments, the light-emitting units 120 in each light-emitting region 111 may be light-emitting units emitting white light, and the plurality of light-emitting regions 111 may be of the same color. In alternative embodiments, the light-emitting units in each light-emitting region may emit light of different colors, and the colors of the emitted light may be set as desired.

As shown in FIG. 1, the covering layer 130 is used to cover the light-emitting regions 111 and the non-light-emitting regions 112, so as to protect the light-emitting units 120 in the light-emitting regions 111. For example, the failure of the light-emitting unit in the light-emitting region caused by the contact between the light-emitting unit in the light-emitting region and substances such as oxygen, moisture in an external environment may be prevented.

For example, the covering layer 130 may be made of a glass material, or may be made of other materials that permit the transmission of light of a specific color.

As shown in FIG. 2A and FIG. 2B, a plurality of support structures 140 are provided in the non-light-emitting regions 112, and/or provided between the light-emitting units 120. The support structures 140 are evenly distributed in the non-light-emitting regions, and/or evenly distributed between the light-emitting units 120. The support structures 140 are used to support the covering layer, so as to prevent the covering layer from being deformed or contacting with the light-emitting unit due to a negative encapsulation pressure (a pressure on a side of the encapsulation layer close to the light-emitting units which is less than an external pressure) when the covering layer covers the light-emitting unit, so that it is possible to prevent damage on the light-emitting unit, or undesirable problems such as Newton's rings.

In the embodiments of the present disclosure, the plurality of support structures 140 are evenly distributed in the non-light-emitting regions 11 and/or between the light-emitting units 120, and a distance between the plurality of support structures 140 may be set according to a specific numerical range of a material deformation performance index of the covering material, for example, the material deformation performance index may be an elastic modulus, etc.

Figure 3A:
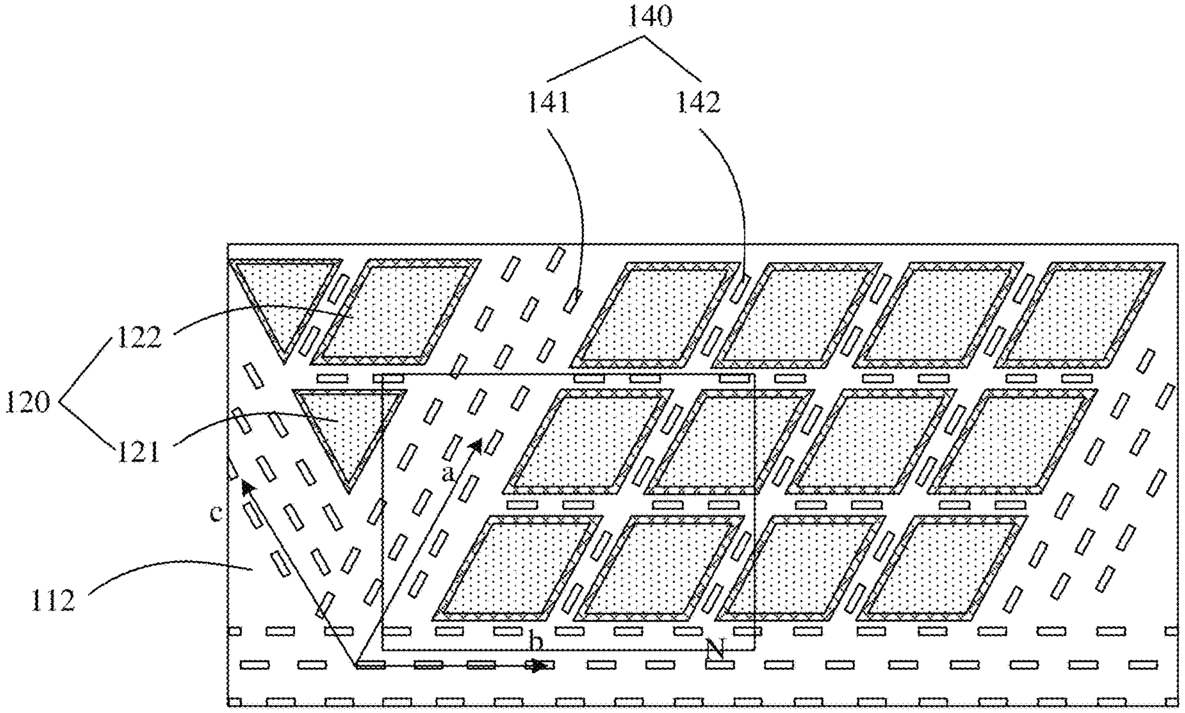
FIG. 3A shows a schematic diagram of a distribution of support structures of a light-emitting substrate according to another embodiment of the present disclosure.
Figure 3B:
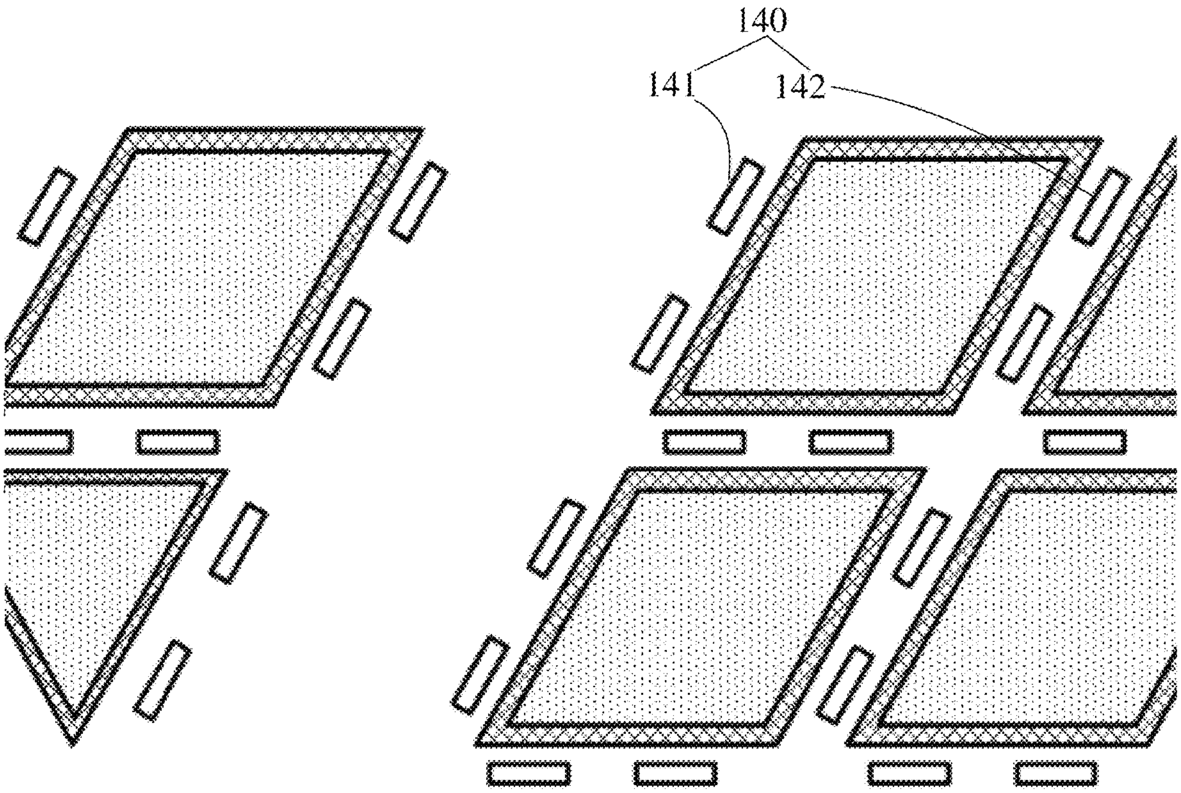
FIG. 3B shows a partial enlarged view of the region N in FIG. 3A.
Figure 3C:
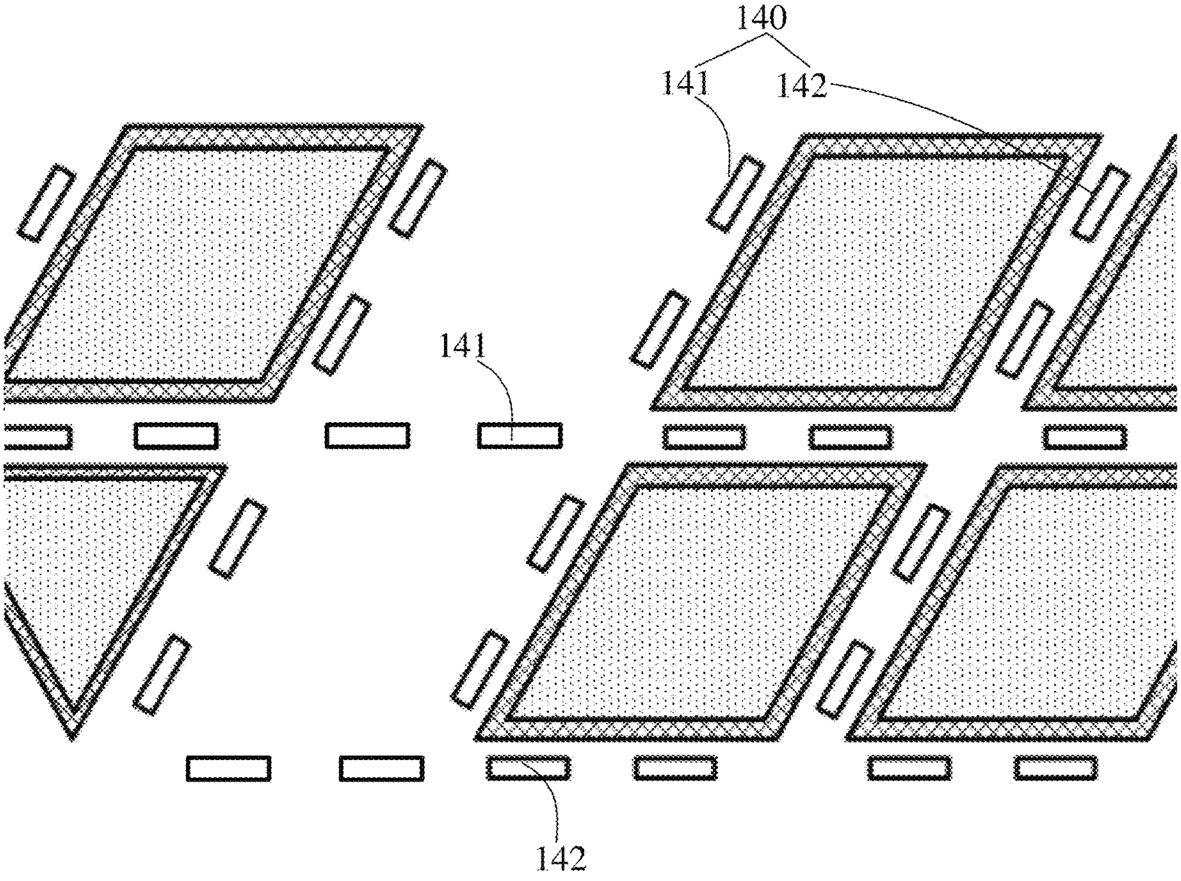
FIG. 3C shows a partial enlarged view corresponding to the region N in FIG. 3A according to some other embodiments of the present disclosure.
Figure 4A:
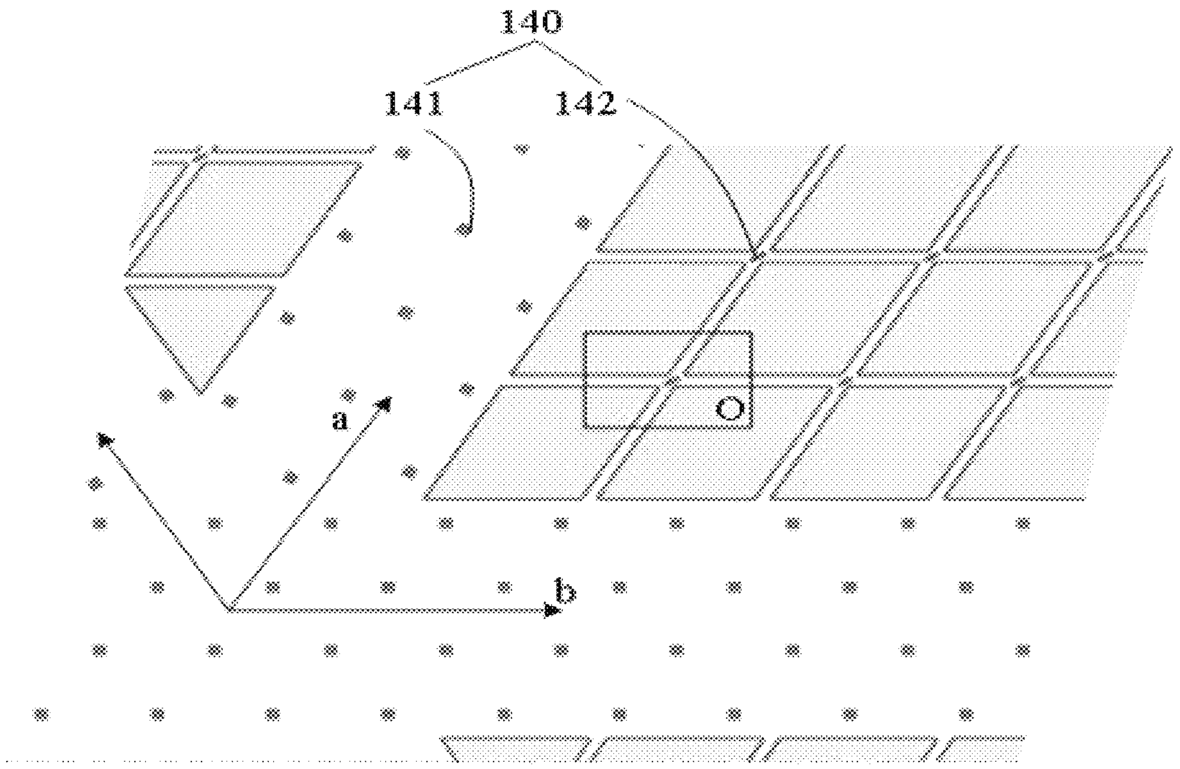
FIG. 4A shows a schematic diagram of a distribution of support structures of a light-emitting substrate according to yet another embodiment of the present disclosure.
Figure 4B:
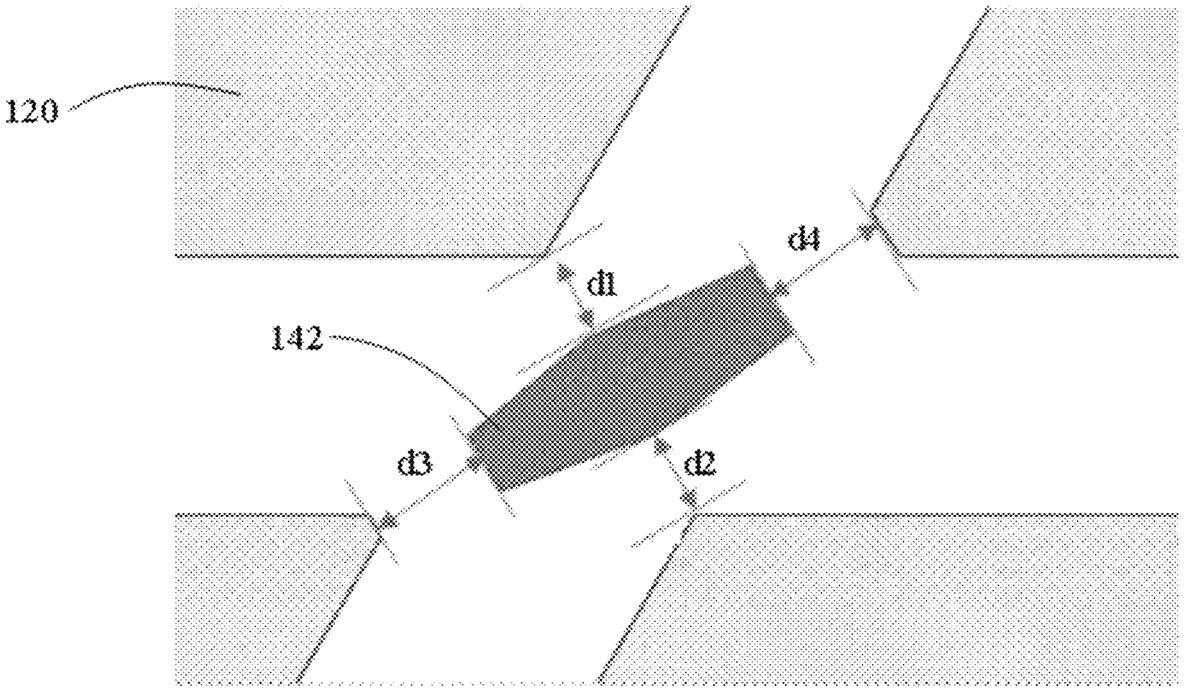
FIG. 4B shows a partial enlarged view of the region O in FIG. 4A.
Figure 4C:
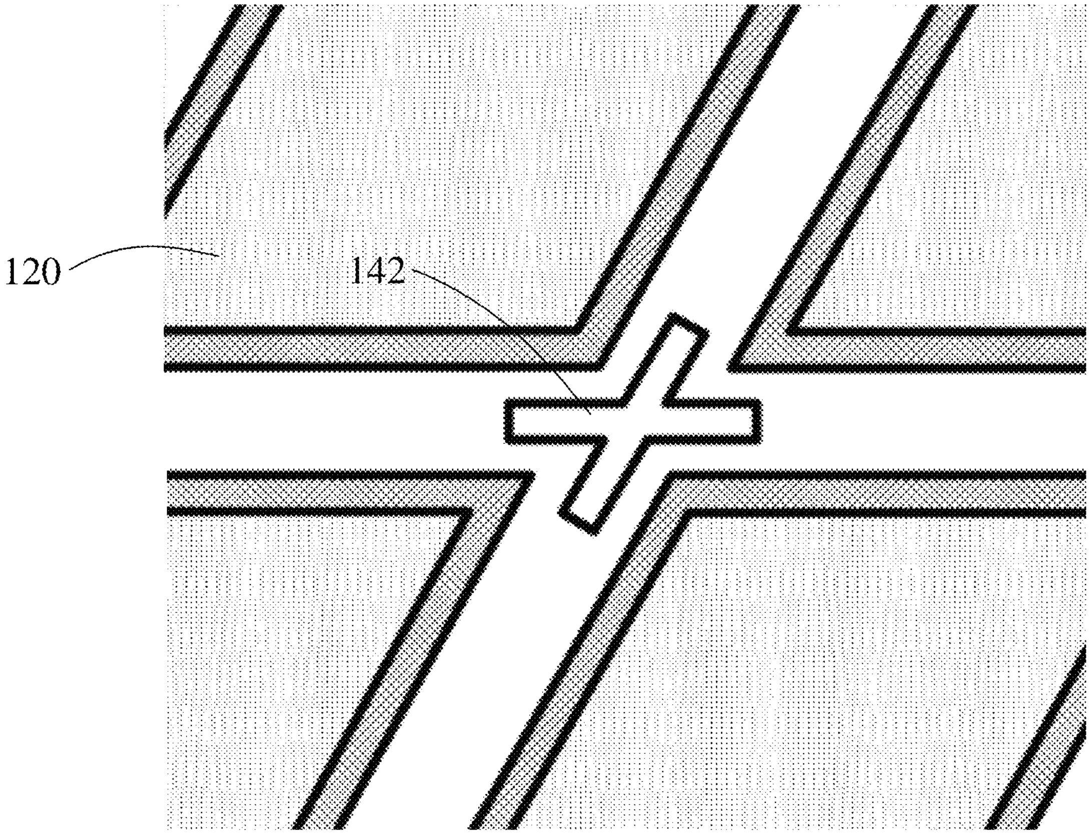
FIG. 4C shows a partial enlarged view corresponding to the region O in FIG. 4A according to some other embodiments of the present disclosure.
Figure 5A:
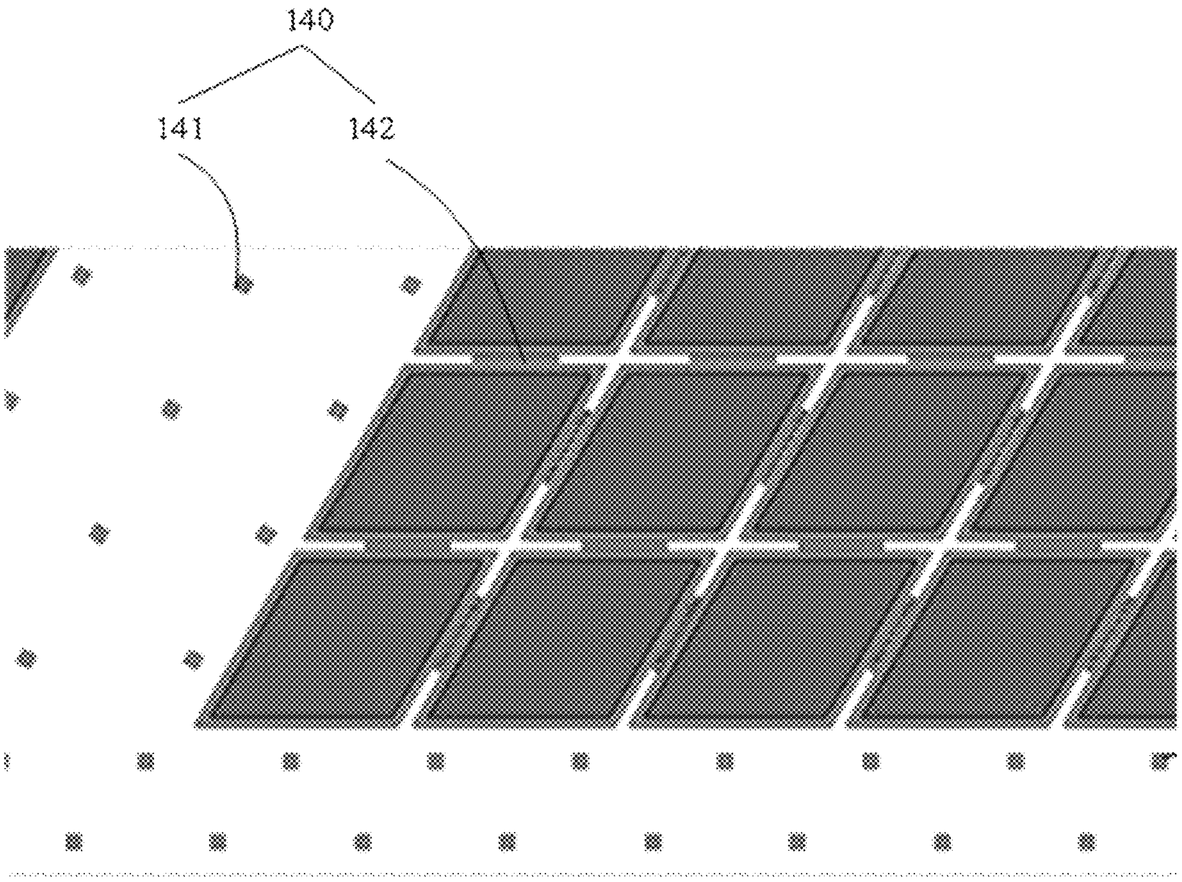
FIG. 5A shows a schematic diagram of a distribution of support structures of a light-emitting substrate according to yet another embodiment of the present disclosure.
Figure 5B:
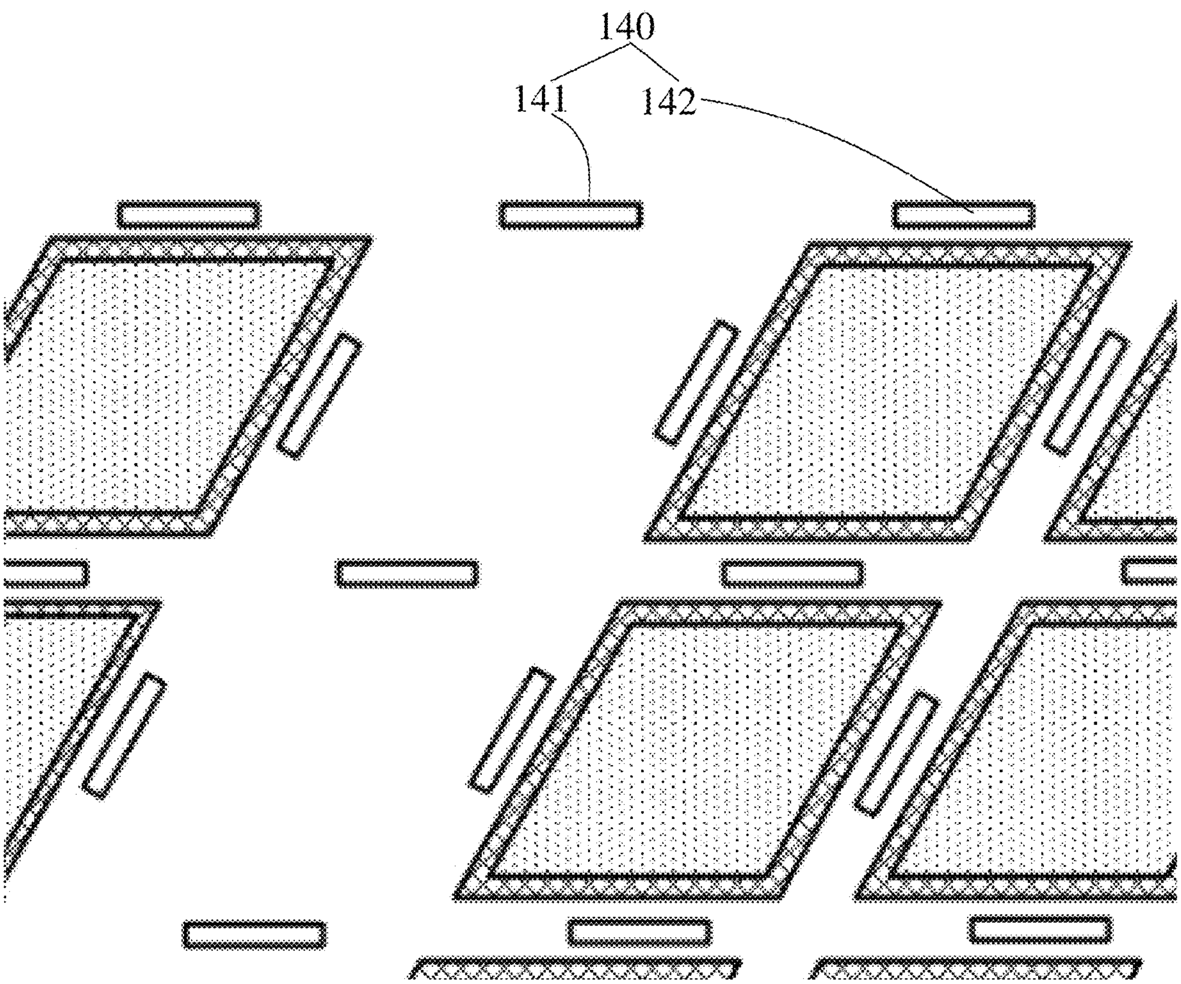
FIG. 5B shows a schematic diagram of a distribution of support structures of a light-emitting substrate according to yet another embodiment of the present disclosure.
Figure 6:
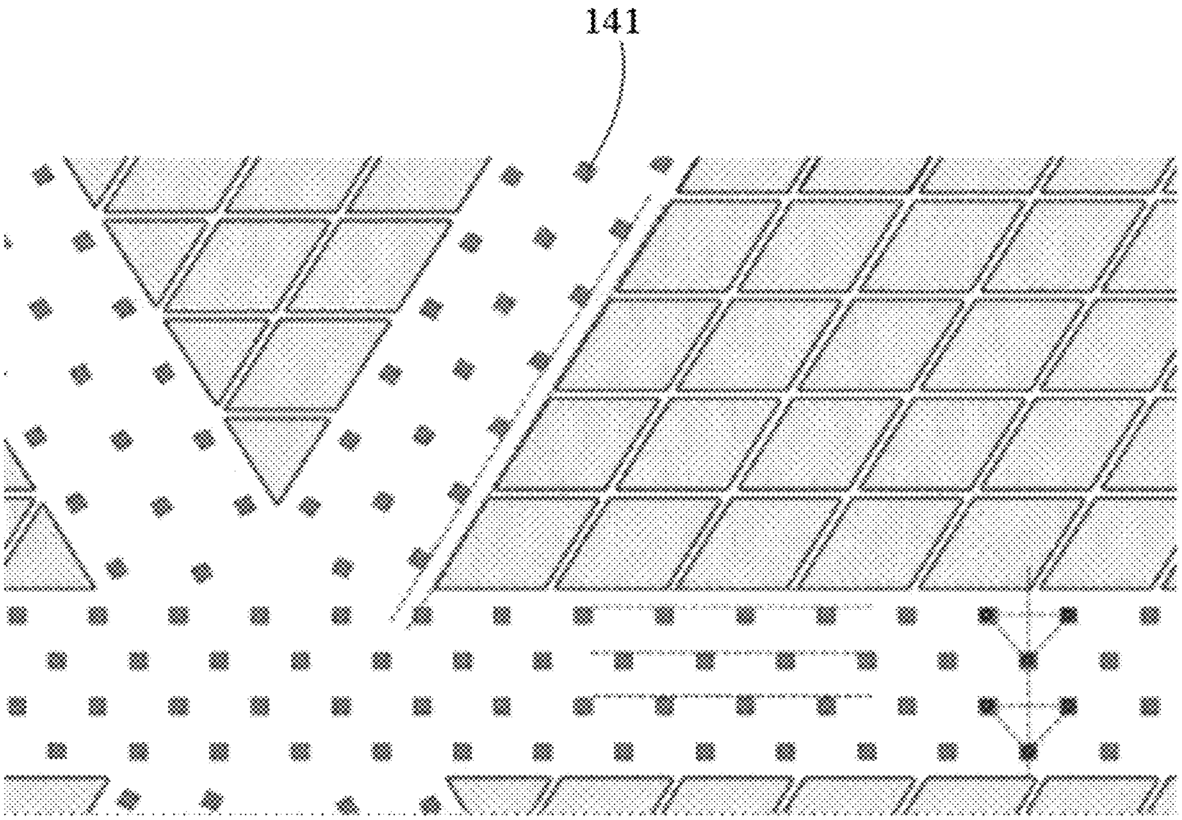
FIG. 6 shows a schematic diagram of a distribution of support structures of a light-emitting substrate according to yet another embodiment of the present disclosure.
Figure 7A:
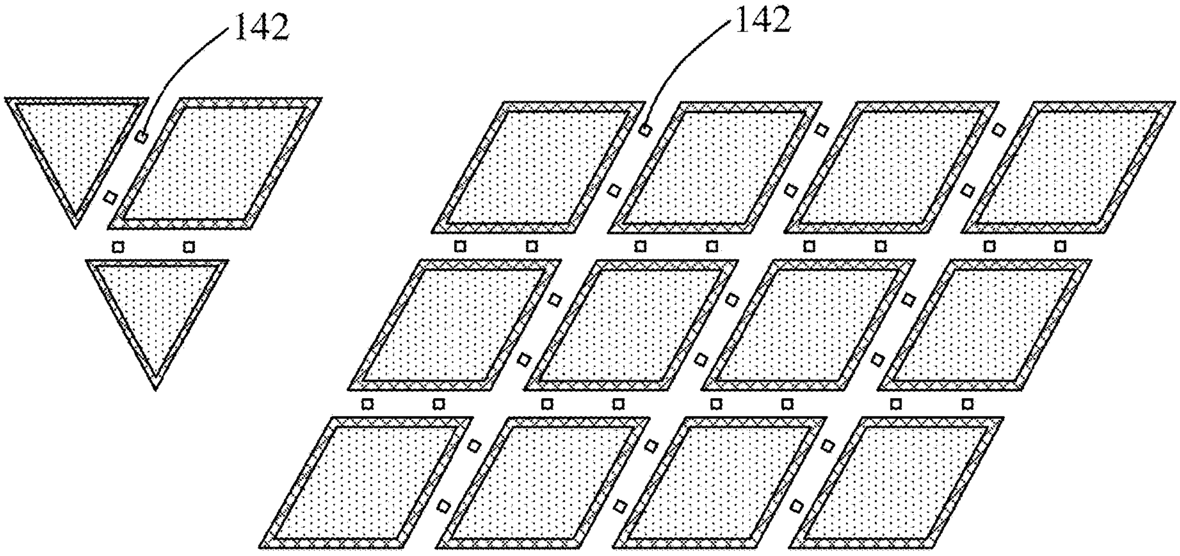
FIG. 7A shows a schematic diagram of a distribution of support structures of a light-emitting substrate according to yet another embodiment of the present disclosure.
Figure 7B:
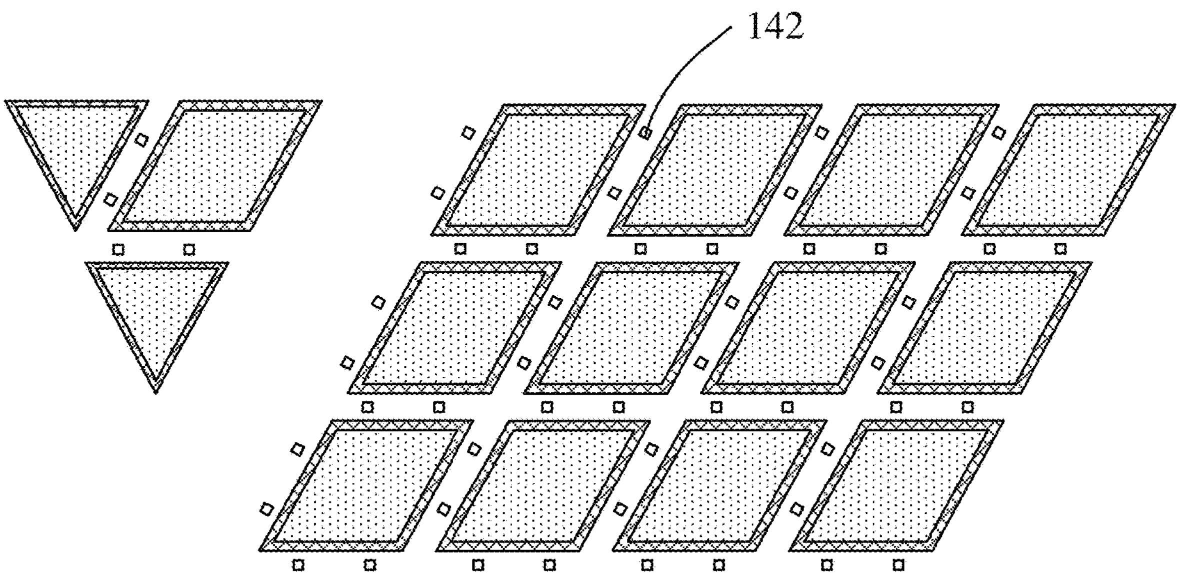
FIG. 7B shows a schematic diagram of a distribution of support structures of a light-emitting substrate according to yet another embodiment of the present disclosure.

FIG. 3A shows a schematic diagram of a distribution of support structures of a light-emitting substrate according to another embodiment of the present disclosure. FIG. 3B shows a partial enlarged view of the region N in FIG. 3A. FIG. 3C shows a partial enlarged view corresponding to the region N in FIG. 3A according to some other embodiments of the present disclosure. FIG. 4A shows a schematic diagram of a distribution of support structures of a light-emitting substrate according to yet another embodiment of the present disclosure. FIG. 4B shows a partial enlarged view of the region O in FIG. 4A. FIG. 4C shows a partial enlarged view corresponding to the region O in FIG. 4A according to some other embodiments of the present disclosure. FIG. 5A shows a schematic diagram of a distribution of support structures of a light-emitting substrate according to yet another embodiment of the present disclosure. FIG. 5B shows a schematic diagram of a distribution of support structures of a light-emitting substrate according to yet another embodiment of the present disclosure. FIG. 6 shows a schematic diagram of a distribution of support structures of a light-emitting substrate according to yet another embodiment of the present disclosure. FIG. 7A shows a schematic diagram of a distribution of support structures of a light-emitting substrate according to yet another embodiment of the present disclosure. FIG. 7B shows a schematic diagram of a distribution of support structures of a light-emitting substrate according to yet another embodiment of the present disclosure.

In the embodiments of the present disclosure, as shown in FIG. 2A to FIG. 5B, the plurality of support structures 140 include a plurality of first support portions 141, and the plurality of first support portions 141 are located in the non-light-emitting region 112. The plurality of first support portions 141 are arranged in a plurality of rows, and the first support portions 141 of each row are arranged in a shape identical to a shape of an edge of the light-emitting region 111.

In an embodiment of the present disclosure, the light-emitting region 111 includes a plurality of side edges, and edges of the plurality of side edges are in straight lines. More than one first support portion between the side edges of two adjacent light-emitting regions is arranged in a shape of a straight line parallel to the side edges.

For example, as shown in FIG. 2A, FIG. 3A and FIG. 4A, more than one first support portion 141 is provided in the non-light-emitting region 112, and the light-emitting region 111 is in a shape of an isosceles triangle with three side edges. The side edges intersect to form the light-emitting region 111, and the side edges are in straight lines. The plurality of rows of first support portions formed by the first support portions are provided between two adjacent light-emitting regions 111 which are in the shape of the isosceles triangle. The first support portions in adjacent rows are spaced apart by the same row spacing, and each row of first support portions are arranged in a straight line and are parallel to the side edge of the light-emitting region 111. For example, the light-emitting region 111 has three side edges, where the first side edge is parallel to a direction a, the second side edge is parallel to a direction b, and the third side edge is parallel to a direction c. More than one row of first support portions arranged in straight line are provided in the non-light-emitting region 112 between the light-emitting regions adjacent to each side edge, and the more than one row of first support portions are arranged in the direction parallel to the side edge adjacent thereto. For example, the first side edge is provided with more than one row of first support portions parallel to the direction a, the second side edge is provided with more than one row of first support portions parallel to the direction b, and the third side edge is provided with more than one row of first support portions parallel to the direction c. These rows of first support portions for the three side edges arranged in different directions meet at an intersection of the direction a, the direction b and the direction c, where the first support portions at the meeting position are arranged parallel to one of the above directions. For example, the first support portions at the intersection position are arranged in the direction parallel to the direction b. In other alternative embodiments, other methods may be adopted.

In the embodiments of the present disclosure, the first support portions in adjacent rows are alternately arranged in a row direction, and orthographic projections of the first support portions in the adjacent rows in a direction perpendicular to the row direction do not overlap with each other.

As shown in FIG. 2A, FIG. 3A and FIG. 4A, first support portions 141 in adjacent rows are alternately arranged in the row direction. For example, for the rows of first support portions 141 along the b direction, the first support portions in adjacent rows are alternately arranged in the b direction. That is, the first support portions of the adjacent rows are staggered with each other, and a first support portion in a first row is between first support portions in a second row. The orthographic projections of the first support portions in the adjacent rows in the direction perpendicular to the row direction do not overlap with each other. For example, orthographic projections of the first support portions in the first row in the direction perpendicular to the b direction do not overlap with orthographic projections of the first support portions in the second row in the direction perpendicular to the b direction. By using such arrangement, it may be ensured that the support portions have a sufficient supporting force, and the risk of scratching of the support structure may be reduced. In addition, by using such alternating and staggered arrangement, the covering layer may be subject to uniform stress when covering an upper side of the light-emitting region, and may not be deformed due to a difference between the internal pressure and the external pressure during the encapsulation process, which may prevent Newton's rings generated by light diffraction caused by a deformation of the covering layer.

In another embodiment of the present disclosure, the light-emitting region includes a curved side edge, and each row of first support portions among more than one row of first support portions at a periphery of each light-emitting region are arranged in a curve identical to a curve of the curved side edge.

Figure 10A:
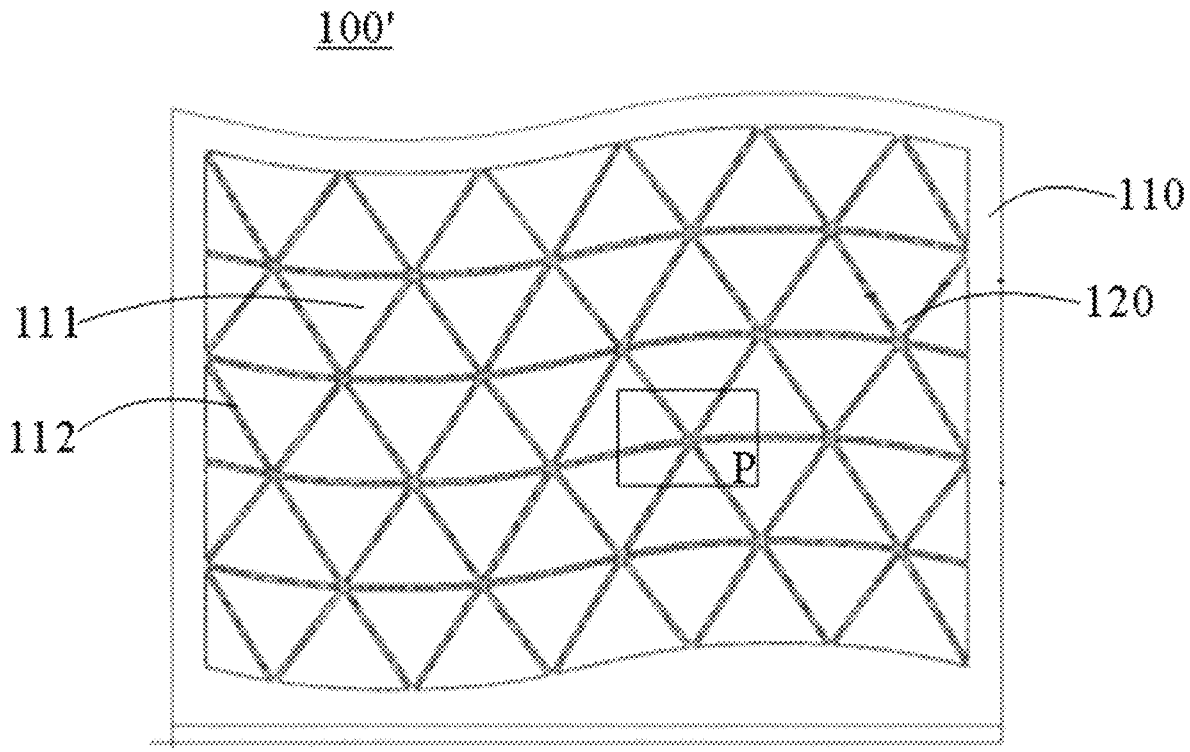
FIG. 10A shows a schematic diagram of a light-emitting substrate according to another embodiment of the present disclosure.
Figure 10B:
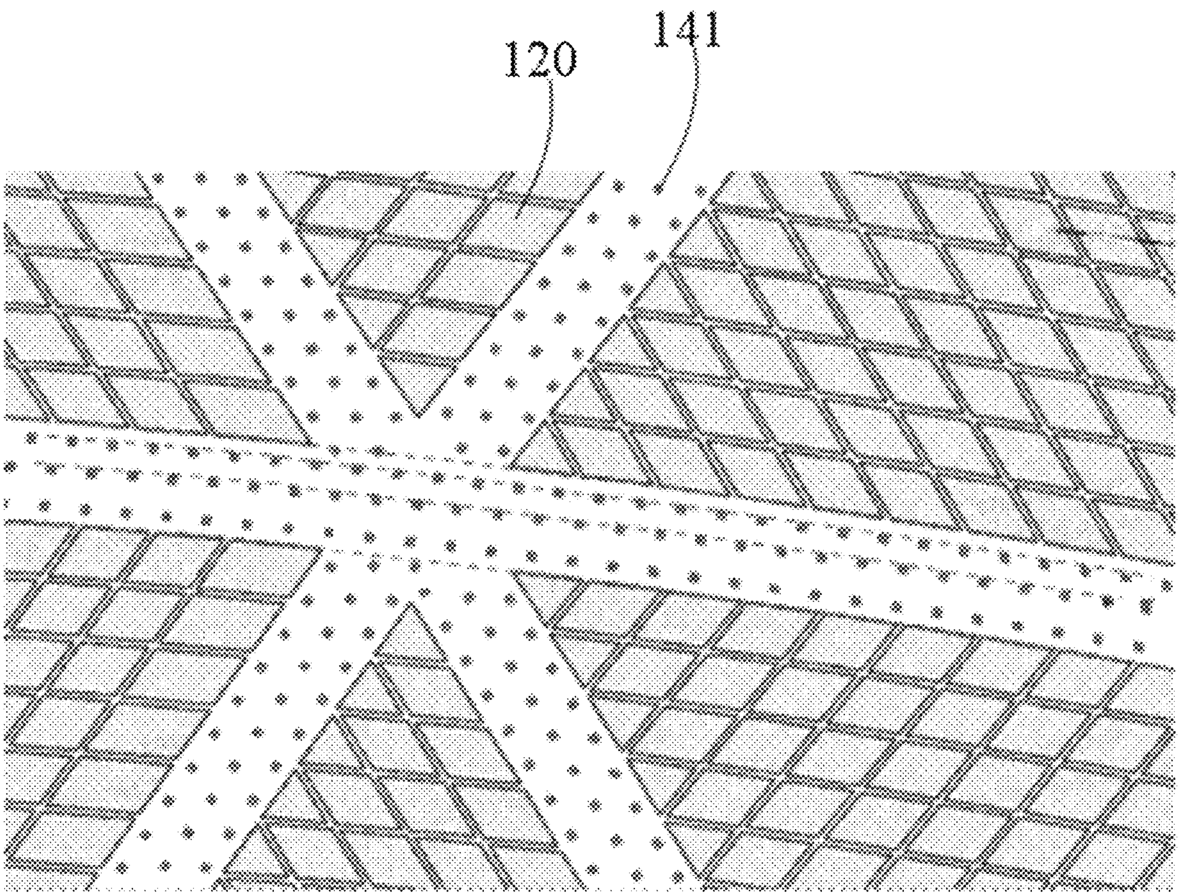
FIG. 10B shows a partial enlarged view of the region P in FIG. 10A.

As shown in FIG. 10A and FIG. 10B below, a light-emitting substrate 100' has a special-shaped light-emitting region 111, and the special-shaped light-emitting region 111 has a curved side edge. The curved side edge is provided with more than one row of first support portions 141, and each row of first support portions 141 are arranged in a curve identical to a curve of the curved side edge. In such embodiments, a side edge of the light-emitting region 111 is set as the curved side edge, such as a lower side edge in FIG. 10A. In other alternative embodiments, one or more side edges of the light-emitting region are set as curved side edges. By providing the more than one row of first support portions, which are arranged in the curve identical to the curve of the curved side edge, between the curved side edges, a uniform support by the support portions may be provided to the light-emitting region at the side edge position, so as to prevent a deformation of the covering layer caused by a non-uniform support, so that a problem of Newton's rings generated by diffraction of the light-emitting units 120 in the light-emitting region 111 may be prevented.

Figure 8:
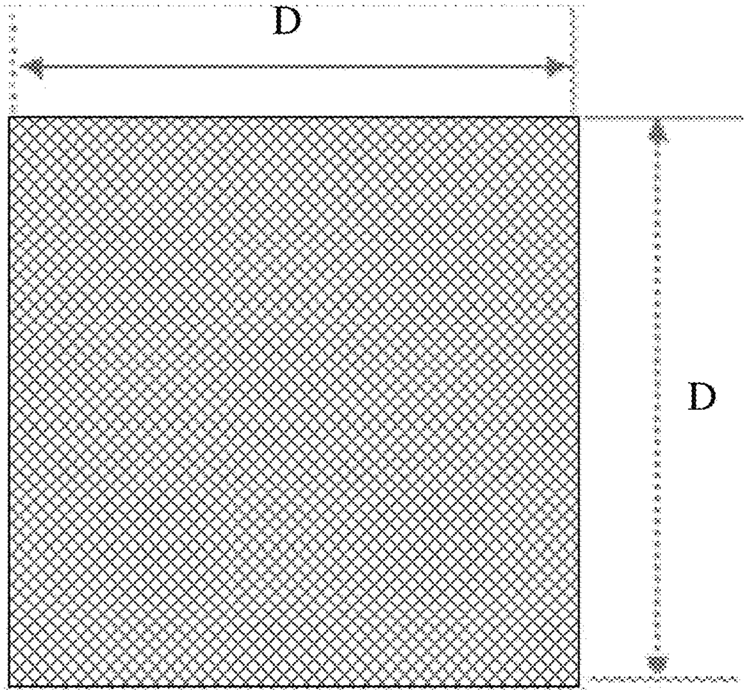
FIG. 8 shows a schematic diagram of a shape of support structures of a light-emitting substrate according to an embodiment of the present disclosure.
Figure 9:
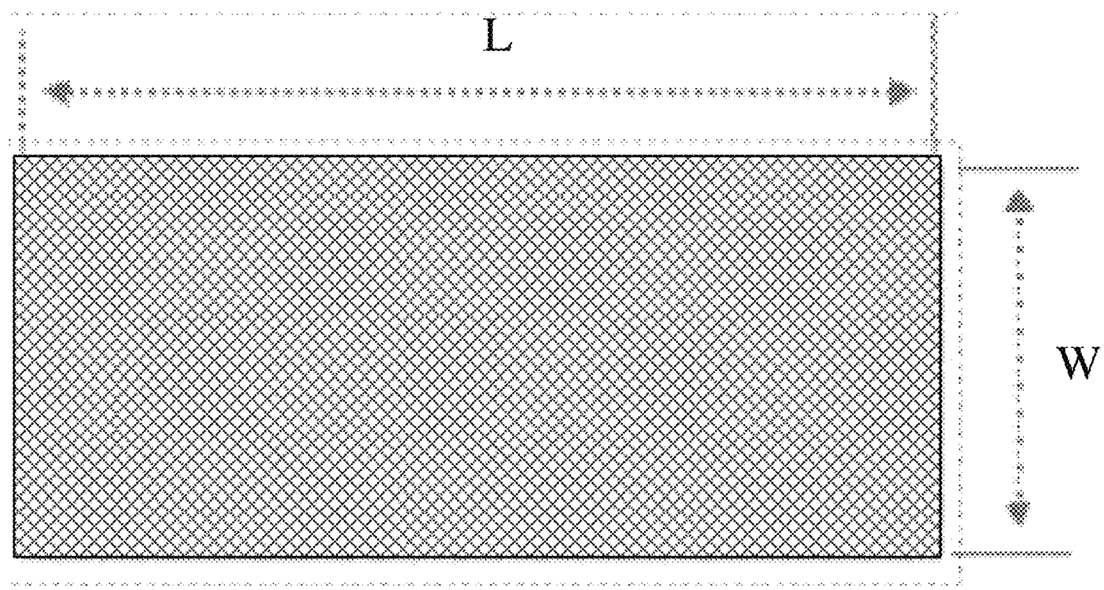
FIG. 9 shows a schematic diagram of a shape of support structures of a light-emitting substrate according to another embodiment of the present disclosure.

FIG. 8 shows a schematic diagram of a shape of a support structure of a light-emitting substrate according to an embodiment of the present disclosure. FIG. 9 shows a schematic diagram of a shape of a support structure of a light-emitting substrate according to another embodiment of the present disclosure.

In the embodiments of the present disclosure, a first section of the first support portion 141 in a plane parallel to a plane in which an upper surface of the base substrate is located has a regular shape. Due to the setting of the regular shape of the first section, the first support portion supports may be subject to more uniform stress when supporting the covering layer, which may prevent the deformation of the covering layer caused by the non-uniform stress.

For example, the regular shape may be, for example, a rectangle, a square, a circle, a regular polygon, etc.

In an embodiment of the present disclosure, as shown in FIG. 2A, FIG. 2B and FIG. 8, the first section is in a shape of a square. A side length D of the square is in a range of 5 microns to 60 microns, such as 5 microns, 10 microns, 20 microns, 30 microns, 40 microns, 50 microns or 60 microns, and the side length D of the square may be adjusted according to an actual deformation performance index of the supporting material.

In another embodiment of the present disclosure, as shown in FIG. 3A, FIG. 3B and FIG. 9, the first section is in a shape of a rectangle, and a length direction of the rectangle is parallel to the side edge of the light-emitting region. That is, rectangles are arranged in a direction parallel to the side edge of the light-emitting region to form the plurality of rows of first support portions. A length L of the rectangle is in a range of 5 microns to 60 microns, and a width W of the rectangle is in a range of 3 microns to 20 microns. For example, the length L is 5 microns and the width W is 3 microns, the length L is 30 microns and the width W is 10 microns, or the length Lis 60 microns and the width W is 20 microns. In alternative embodiments, the length and the width of the rectangle may be designed according to appropriate requirements.

In the embodiments of the present disclosure, the plurality of support structures include a plurality of second support portions, and the plurality of second support portions are between the light-emitting units in the light-emitting region. The plurality of second support portions are arranged in one row between adjacent light-emitting units, and the row of the second support portions are arranged in a direction parallel to a direction in which the light-emitting units are arranged.

As shown in FIG. 2A to FIG. 4C, the support structures 140 further include a plurality of second support portions 142, and the plurality of second support portions 142 are between the light-emitting units 120 in the light-emitting region 111. One or more second support portions 142 may be provided between adjacent light-emitting units 120. The second support portions 142 are arranged in one row between the adjacent light-emitting units, and the row of second support portions 142 are arranged in a direction parallel to the direction in which the light-emitting units are arranged. For example, the light-emitting units are arranged in the direction b, and the plurality of second support portions 142 are arranged in the direction parallel to the b direction, so as to form an array structure.

In the embodiments of the present disclosure, the covering layer 130 may be more effectively supported by providing the plurality of second support portions 142 in the light-emitting region 111, so that the problem of Newton's rings caused by the deformation of the material of the covering layer 130 due to a negative pressure may be prevented.

In the embodiments of the present disclosure, as shown in FIG. 2A and FIG. 3A, the second support portions 142 include a side edge support portion disposed between adjacent sides of two adjacent light-emitting units.

For example, side edge support portions are disposed between the adjacent sides of the two adjacent light-emitting units, and are arranged in one row.

In the embodiments of the present disclosure, a second section of the side edge support portion in a plane parallel to the plane in which the upper surface of the base substrate is located is in a shape of a rectangle. Since the spacing between the light-emitting units is small, by setting the shape of the second section of the side edge support portion to a rectangle, it may be ensured that the side edge support portions provide a good support for the covering layer 130.

In an embodiment of the present disclosure, more than one side edge support portions are provided between adjacent side edges of two light-emitting units, and the second section of each side edge support portion is in a shape of a rectangle, where a length of the rectangle is in a range of 5 microns to 60 microns, and a width of the rectangle is in a range of 3 microns to 20 microns. The length and the width of the rectangle may be set to any values within the above-mentioned ranges.

In another embodiment of the present disclosure, as shown in FIG. 5A and FIG. 5B, one side edge support portion is provided between adjacent sides of two light-emitting units, that is, the side edge of each light-emitting unit is provided with only one side edge support portion. The second section of the side edge support portion is in a shape of a rectangle, where a length of the rectangle is in a range of 20 microns to 300 microns, and a width of the rectangle is in a range of 3 microns to 30 microns. By providing the one side edge support portion, a good support force may be provided. In addition, since the spacing between two light-emitting units is small, a great support force may be provided by setting the shape of the side edge support portion to a rectangle with a large length, so that the deformation of the covering layer due to the negative pressure during the encapsulation may be well prevented.

In another embodiment of the present disclosure, as shown in FIG. 4A, FIG. 4B and FIG. 4C, the second support portions 142 include a vertex support portion disposed between adjacent vertices of four adjacent light-emitting units. That is, the second support portion is disposed between the adjacent vertices of the four light-emitting units, and no second support portion is provided at other positions.

The covering layer on the light-emitting units at a periphery of the second support portion may be supported by providing the second support portion 142 between the adjacent vertices of the four light-emitting units, so as to prevent scratching between the covering layer and the light-emitting units.

In such embodiments, among the four adjacent light-emitting units, the vertices of light-emitting units opposite to each other have a same distance to the vertex support portion. For example, as shown in FIG. 4B, for a pair of light-emitting units opposite to each other, a distance from the vertex of one light-emitting unit to the vertex support portion and a distance from the vertex of the other light-emitting unit to the vertex support portion are d1 and d2, respectively, where d1=d2. For the other pair of opposite light-emitting units, a distance from the vertex of one light-emitting unit to the vertex support portion and a distance from the vertex of the other light-emitting unit to the vertex support portion are d3 and d4, respectively, where d3=d4. In other embodiments of the present disclosure, d1 and d3 may be equal, or may not be equal.

In the embodiments of the present disclosure, the vertex support portion has a length direction and a width direction. In the length direction, a distance from the vertex support portion to the vertex of the light-emitting unit is in a range of 3 microns to 30 microns. For example, there is d3=d4, and d3 and d4 are in the range of 3 microns and 30 microns.

In the width direction, a distance from the vertex support portion to the vertex of the light-emitting unit is in a range of 2 microns to 20 microns. For example, there is d1=d2, and d1 and d2 are in the range of 2 microns and 20 microns.

In the embodiments of the present disclosure, a third section of the vertex support portion in a plane parallel to the plane in which the upper surface of the base substrate is located is in a shape of an axisymmetric figure. For example, a symmetry axis of the axisymmetric figure is a line connecting adjacent vertices of two adjacent light-emitting units opposite to each other.

For example, the third section may be in a shape of a regular hexagon, a diamond, etc., or an axisymmetric hexagon as shown in FIG. 4B, or an axisymmetric X-shape as shown in FIG. 4C.

In the embodiments of the present disclosure, a height of the support structure is in a range of 0.5 microns to 5 microns. When the height of the support structure is less than 0.5 microns, the supporting force may be insufficient, which may cause scratching on the light-emitting unit in the light-emitting region by the covering layer after the encapsulation. When the height of the support structure is large, for example, more than 5 microns, the exceeded support structure may bear a great pressure, which may also cause the deformation of the covering layer, resulting in the problem such as Newton's rings.

In the embodiments of the present disclosure, as shown in FIG. 6, when the covering material layer has a good material deformation performance index, it may be selected to dispose a plurality of support structures in the non-light-emitting region, that is, only the plurality of first support portions 141 are provided to support the covering layer, which may prevent the problem of Newton's rings.

As shown in FIG. 3C and FIG. 5B, some of the plurality of first support portions 141 extend in the direction a, and some others of the plurality of first support portions 141 extend in the direction b. In this way, a distribution of the plurality of first support portions 141 is substantially consistent with a distribution of the plurality of second support portions 142, so that a more uniform supporting force may be provided.

In another embodiment of the present disclosure, as shown in FIG. 7A, the plurality of support structures are only provided between the light-emitting units in the plurality of light-emitting regions, that is, only the second support portions 142 are provided, so that the covering layer on a side of the light-emitting region away from the base substrate may be effectively supported, so as to prevent the problem of Newton's rings.

In some other embodiments of the present disclosure, as shown in FIG. 7B, more than one support structures are provided between the light-emitting units in the plurality of light-emitting regions, and a circle of support structures may also be provided around the light-emitting units, that is, the second support portions 142 are provided. In this way, the covering layer on the side of the light-emitting region away from the base substrate may be effectively supported, so as to prevent the problem of Newton's rings.

FIG. 10A is a schematic diagram of a light-emitting substrate according to another embodiment of the present disclosure. FIG. 10B is a partial enlarged view of the region P in FIG. 10A.

As shown in FIG. 10A and FIG. 10B, in such embodiment, the light-emitting region of the light-emitting substrate has an irregular boundary, such as a curved-surface boundary. The light-emitting region has at least one side edge that is identical to the curved-surface boundary. As shown in FIG. 10B, the support structures in the non-light-emitting region adjacent to the curved-surface side edge of the light-emitting region is arranged in a direction identical to the curved-surface side edge of the light-emitting region, so that the material of the covering layer of the light-emitting region may be effectively supported.

Figure 11:
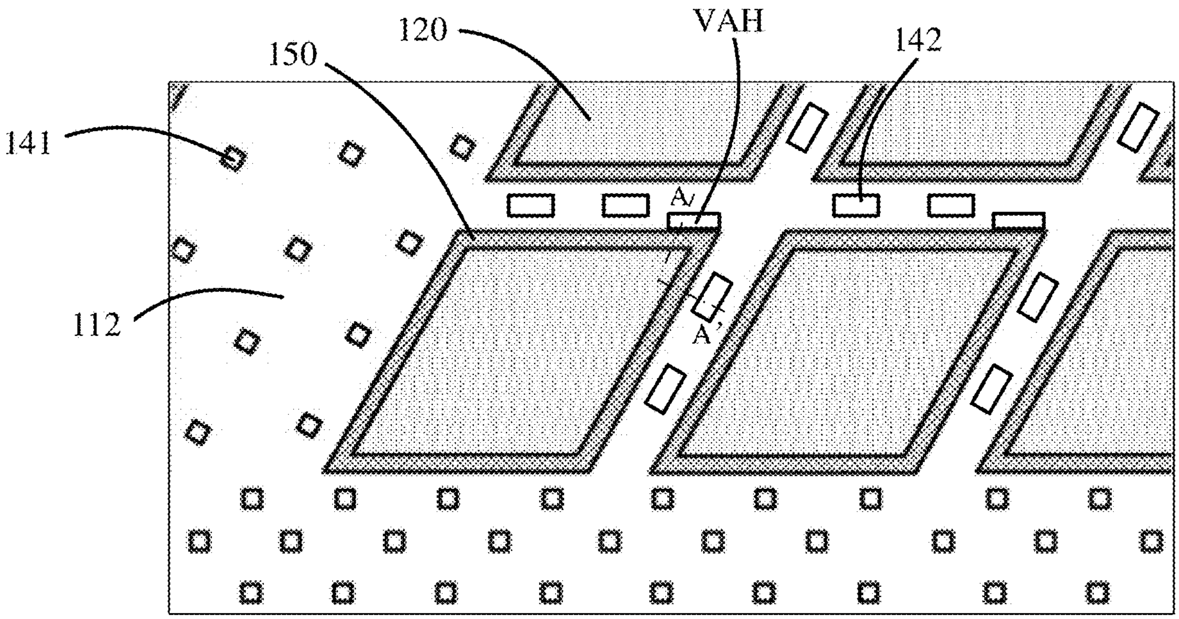
FIG. 11 shows a schematic diagram of a shape of a support structure of a light-emitting substrate according to an embodiment of the present disclosure, which schematically shows a relative positional relationship between an anode connecting hole and the support structure.
Figure 12:
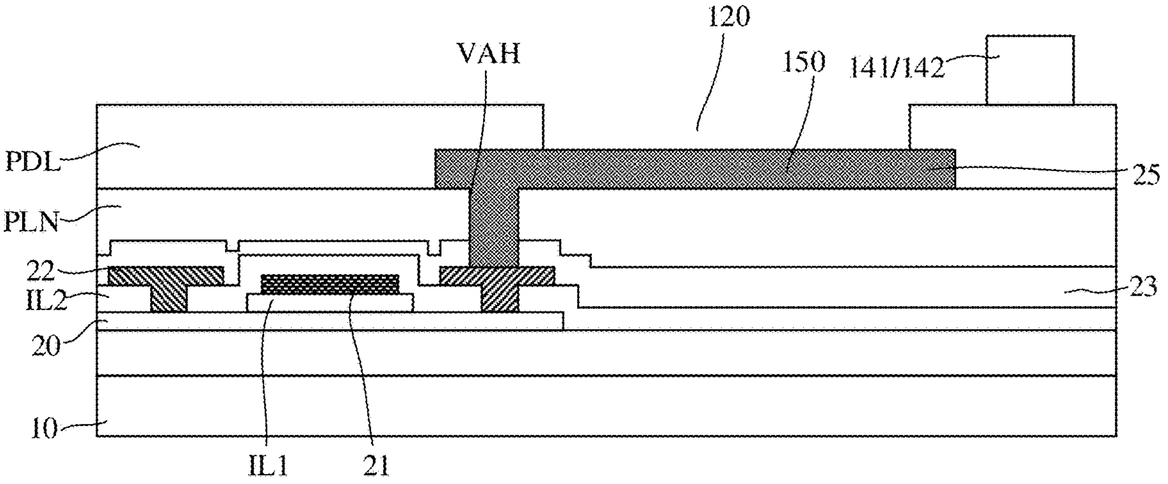
FIG. 12 shows a schematic sectional view of a light-emitting substrate according to some exemplary embodiments of the present disclosure, for example, FIG. 12 may be a sectional view taken along line AA' in FIG. 11.

FIG. 11 is a schematic diagram of a shape of a support structure of a light-emitting substrate according to an embodiment of the present disclosure, which schematically shows a relative positional relationship between an anode connecting hole and the support structure. FIG. 12 is a schematic sectional view of a light-emitting substrate according to some exemplary embodiments of the present disclosure, for example, FIG. 12 may be a sectional view taken along line AA' in FIG. 11. Referring to FIG. 1, FIG. 2, FIG. 11 and FIG. 12, the light-emitting substrate may include a pixel driver circuit layer, a planarization layer PLN and a pixel defining layer PDL, which are sequentially stacked on a base substrate 10.

A structure of the above-mentioned base substrate 10 includes various types, which may be selected according to actual needs. For example, the base substrate 10 may be a rigid substrate. For another example, the base substrate 10 may be a flexible substrate.

For example, as shown in FIG. 12, the pixel driver circuit layer may include a semiconductor layer 20, a gate insulating layer IL1, a first conductive layer 21, an interlayer insulating layer IL2 and a second conductive layer 22, which are sequentially stacked.

For example, the first conductive layer 21 includes a plurality of gates, the semiconductor layer includes a plurality of active patterns, and the second conductive layer 22 includes a plurality of sources and a plurality of drains. Correspondingly, an active pattern, a gate, a source and a drain may, for example, form a transistor, and a plurality of transistors may, for example, form a pixel driver circuit. The pixel driver circuit layer may include a plurality of pixel driver circuits. As shown in FIG. 12, a transistor is used to schematically represent a pixel driver circuit.

In some examples, as shown in FIG. 12, the light-emitting substrate further includes: a plurality of light-emitting devices located at a side of the planarization layer PLN away from the base substrate 10 and in a display area. The light-emitting device may be, for example, an OLED.

For example, the light-emitting device includes an anode, a light-emitting layer, and a cathode, which are sequentially stacked.

For example, the anode of the light-emitting device is disposed on a side surface of the planarization layer PLN away from the base substrate 10. The anode of a light-emitting device may be electrically connected to a pixel driver circuit P by passing through the planarization layer PLN.

For example, a structure of the anode may be a composite structure composed of transparent conductive oxide film layer/metal film layer/transparent conductive oxide film layer which are stacked in sequence. A material of the above-mentioned transparent conductive oxide film layer is, for example, ITO (Indium tin oxide) or IZO (Indium zinc oxide), and a material of the above-mentioned metal film layer is, for example, any one of gold (Au), silver (Ag), nickel (Ni) or platinum (Pt).

For example, the above-mentioned pixel defining layer PDL has a plurality of openings 120. An opening exposes a part of an anode 150. At least a part of a light-emitting layer is located in an opening to form an electrical connection with an anode 150 corresponding to the light-emitting layer. That is, each light-emitting layer is electrically connected to its corresponding anode 150 through a part or the whole of the light-emitting layer located in a corresponding opening.

Here, an arrangement method of the light-emitting layer is related to a manufacturing process of the light-emitting layer. For example, when the light-emitting layer is formed by an evaporation process, a part of the light-emitting layer may be located in the corresponding opening, and another part of the light-emitting layer may be overlapped on the pixel defining layer PDL around the opening. When the light-emitting layer is formed by an inkjet printing process, the whole of the light-emitting layer is located in the corresponding opening.

For example, the cathode is located on a side of the pixel defining layer PDL away from the base substrate 10. Cathodes of the light-emitting devices may be electrically connected to each other to form as an integral structure.

For example, a material of the cathode may be any one of aluminum (Al), silver (Ag) or magnesium (Mg), or may be a magnesium-silver alloy or an aluminum-lithium alloy.

In the embodiments of the present disclosure, the light-emitting layer of the light-emitting device of each sub-pixel may be formed by the evaporation process. Through research, the inventors have found that a fine metal mask (FMM for short) is required in the evaporation process. In this case, it is required to manufacture a photo spacer (PS for short) on the pixel defining layer PDL to prevent a defect due to scratching to the pixel structure caused by a direct contact between the fine metal mask (FMM for short) and a pixel structure during the evaporation process of the organic light-emitting material of OLED. In an actual manufacturing process, for some OLED display products, a large FMM through hole is designed, and FMM may have a large sag amount due to gravity, which may increase the possibility of large-area contact between FMM and the light-emitting substrate. In this case, the FMM may be in contact with both the display area and a peripheral are (i.e., a frame area) of the light-emitting substrate, resulting in other undesirable phenomena, such as a scratch on a GOA driver circuit disposed in the peripheral are, an electrostatic discharge (i.e., ESD) caused by a contact with the circuit, etc. For this reason, in the embodiments of the present disclosure, the support structures, such as the above-mentioned support structures 141 and 142, are manufactured on the pixel defining layer PDL.

As shown in FIG. 12, the light-emitting substrate may include: the base substrate 10; the semiconductor layer 20 disposed on the base substrate 10; the first conductive layer 21 disposed on a side of the semiconductor layer 20 away from the base substrate 10; the second conductive layer 22 disposed on a side of the first conductive layer 21 away from the base substrate 10; an interlayer insulating layer 23 disposed on a side of the second conductive layer 22 away from the base substrate 10; a third conductive layer 24 disposed on a side of the interlayer insulating layer 23 away from the base substrate 10; the planarization layer PLN disposed on a side of the third conductive layer 24 away from the base substrate 10; a first electrode layer (for example, the anode 150 is located in the first electrode layer) disposed on a side of the planarization layer PLN away from the base substrate 10; the pixel defining layer PDL disposed on a side of the first electrode layer away from the base substrate 10; and the support structures disposed on a side of the pixel defining layer PDL away from the base substrate 10.

It will be noted that the light-emitting substrate according to the embodiments of the present disclosure is not limited to the above-mentioned film layers. One or more insulating layers may be provided between the conductive layers. For example, a first insulating layer IL1 may be provided between the semiconductor layer 20 and the first conductive layer 21, and a second insulating layer IL2 may be provided between the first conductive layer 21 and the second conductive layer 22. The planarization layer PLN may include one planarization layer or a plurality of planarization sub-layers.

Referring to FIG. 11 and FIG. 12, the light-emitting substrate further includes an anode connecting hole VAH, and the anode 150 is electrically connected to a corresponding driver circuit through the anode connecting hole VAH. An orthographic projection of the anode connecting hole VAH on the base substrate 10 falls within an orthographic projection of the pixel defining layer PDL on the base substrate, and the orthographic projection of the anode connecting hole VAH on the base substrate is spaced apart from orthographic projections of the support structures 141 and 142 on the base substrate 10.

For example, a plurality of the support structures 141 and 142 are spaced apart from each other and distributed between the anode connecting holes VAH of two adjacent light-emitting units.

Optionally, the embodiments of the present disclosure further provide a display light-emitting apparatus including the above-mentioned light-emitting substrate.

Optionally, the embodiments of the present disclosure further provide a lighting apparatus including the above-mentioned light-emitting substrate or the above-mentioned light-emitting apparatus. For example, the lighting apparatus may be applied to scenarios such as indoor lighting, vehicle lighting, etc. It will be understood that the lighting apparatus has the same advantages as the light-emitting substrate provided by the foregoing embodiments.

Although some embodiments of the general inventive concept of the present disclosure have been illustrated and described, those skilled in the art will understand that changes may be made to the embodiments without departing from the principle and spirit of the general inventive concept of the present disclosure, and the scope of the present disclosure is defined by the claims and their equivalents.

What is claimed is:

1. A light-emitting substrate, comprising:

a base substrate comprising a plurality of light-emitting regions and a plurality of non-light-emitting regions, wherein the plurality of light-emitting regions are arranged in an array, and at least one of the non-light-emitting regions is located between the light-emitting regions;

a plurality of light-emitting units located in the plurality of light-emitting regions respectively, wherein in each light-emitting region, more than one light-emitting unit is arranged in an array;

a pixel defining layer comprising a plurality of openings; and a plurality of support structures disposed on a side of the pixel defining layer away from the base substrate, wherein the plurality of support structures are arranged in an array, and are distributed in the plurality of non-light-emitting regions and between the more than one light-emitting unit, wherein the plurality of support structures comprise a plurality of first support portions in the non-light-emitting regions; and the plurality of first support portions are arranged into a plurality of rows, and the rows of first support portions are arranged in a shape identical to a shape of edges of the light-emitting regions; and wherein a first section of each first support portion in a plane parallel to a plane in which an upper surface of the base substrate is located is in a shape of a square, and a side length of the square is in a range of 5 microns to 60 microns.

2. The light-emitting substrate according to claim 1, wherein each light-emitting region comprises a plurality of side edges, and edges of the plurality of side edges are in straight lines, and more than one first support portion between side edges of two adjacent light-emitting regions are arranged in a shape of a straight line parallel to the side edge.

3. The light-emitting substrate according to claim 2, wherein the first support portions in adjacent rows are alternately arranged in a row direction; and orthographic projections of the first support portions in the adjacent rows in a direction perpendicular to the row direction do not overlap with each other.

4. A light-emitting substrate, comprising:

a base substrate comprising a plurality of light-emitting regions and a plurality of non-light-emitting regions, wherein the plurality of light-emitting regions are arranged in an array, and at least one of the non-light-emitting regions is located between the light-emitting regions;

a plurality of light-emitting units located in the plurality of light-emitting regions respectively, wherein in each light-emitting region, more than one light-emitting unit is arranged in an array;

a pixel defining layer comprising a plurality of openings; and a plurality of support structures disposed on a side of the pixel defining layer away from the base substrate, wherein the plurality of support structures are arranged in an array, and are distributed in the plurality of non-light-emitting regions and between the more than one light-emitting unit, wherein the plurality of support structures comprise a plurality of first support portions in the non-light-emitting regions; and the plurality of first support portions are arranged into a plurality of rows, and the rows of first support portions are arranged in a shape identical to a shape of edges of the light-emitting regions; and wherein each light-emitting region comprises a curved side edge, and each row of the first support portions at a periphery of each light-emitting region is arranged in a curve identical to a curve of the curved side edge.

5. A light-emitting substrate, comprising:

a base substrate comprising a plurality of light-emitting regions and a plurality of non-light-emitting regions, wherein the plurality of light-emitting regions are arranged in an array, and at least one of the non-light-emitting regions is located between the light-emitting regions;

a plurality of light-emitting units located in the plurality of light-emitting regions respectively, wherein in each light-emitting region, more than one light-emitting unit is arranged in an array;

a pixel defining layer comprising a plurality of openings; and a plurality of support structures disposed on a side of the pixel defining layer away from the base substrate, wherein the plurality of support structures are arranged in an array, and are distributed in the plurality of non-light-emitting regions and between the more than one light-emitting unit, wherein the plurality of support structures comprise a plurality of first support portions in the non-light-emitting regions; and the plurality of first support portions are arranged into a plurality of rows, and the rows of first support portions are arranged in a shape identical to a shape of edges of the light-emitting regions;

wherein a first section of each first support portion in a plane parallel to a plane in which an upper surface of the base substrate is located is in a shape of a rectangle, and a length direction of the rectangle is parallel to an edge of the light-emitting regions, and wherein a length of the rectangle is in a range of 5 microns to 60 microns, and a width of the rectangle is in a range of 3 microns to 20 microns.

6. The light-emitting substrate according to claim 1, wherein the plurality of support structures comprise a plurality of second support portions, and the plurality of second support portions are between the more than one light-emitting unit in the light-emitting region; and the plurality of second support portions are arranged into one row between adjacent light-emitting units, and the one row of second support portions is arranged in a direction parallel to an edge direction of an opening of the pixel defining layer, wherein the opening corresponds to a respective light-emitting unit.

7. The light-emitting substrate according to claim 6, wherein the second support portions comprise a side edge support portion disposed between adjacent side edges of two adjacent light-emitting units.

8. The light-emitting substrate according to claim 7, wherein a second section of the side edge support portion in a plane parallel to a plane in which an upper surface of the base substrate is located is in a shape of a rectangle.

9. The light-emitting substrate according to claim 8, wherein more than one side edge support portion is provided between adjacent side edges of two light-emitting units, and a length of the rectangle is in a range of 5 microns to 60 microns, and a width of the rectangle is in a range of 3 microns to 20 microns.

10. The light-emitting substrate according to claim 8, wherein one side edge support portion is provided between adjacent edges of two light-emitting units, and a length of the rectangle is in a range of 20 microns to 300 microns, and a width of the rectangle is in a range of 3 microns to 30 microns.

11. The light-emitting substrate according to claim 6, wherein the second support portions comprise a vertex support portion disposed between adjacent vertices of four adjacent light-emitting units.

12. The light-emitting substrate according to claim 11, wherein among the four adjacent light-emitting units, the vertices of light-emitting units opposite to each other have a same distance to the vertex support portion.

13. The light-emitting substrate according to claim 12, wherein the vertex support portion has a length direction and a width direction, in the length direction, a distance from the vertex support portion to the vertex of the light-emitting unit is in a range of 3 microns to 30 microns, and in the width direction, a distance from the vertex support portion to the vertex of the light-emitting unit is in a range of 2 microns to 20 microns.

14. The light-emitting substrate according to claim 11, wherein a third section of the vertex support portion in a plane parallel to a plane in which an upper surface of the base substrate is located is in a shape of an axisymmetric figure, and a symmetry axis of the axisymmetric figure is a line connecting adjacent vertices of two adjacent and opposite light-emitting units.

15. The light-emitting substrate according to claim 1, further comprising:

a covering layer covering the light-emitting region and the non-light-emitting region, wherein at least a part of the covering layer is supported by the plurality of support structures;

an anode disposed on the base substrate, wherein a layer in which the anode is located is on a side of the pixel defining layer close to the base substrate;

a driver circuit disposed on the base substrate, wherein a layer in which the driver circuit is located is on a side of the layer in which the anode is located close to the base substrate; and an anode connecting hole, wherein the anode is electrically connected to the driver circuit corresponding to the anode through the anode connecting hole, wherein an orthographic projection of the anode connecting hole on the base substrate falls within an orthographic projection of the pixel defining layer on the base substrate, and the orthographic projection of the anode connecting hole on the base substrate is spaced apart from an orthographic projection of the support structure on the base substrate; and wherein the plurality of support structures are spaced apart from each other and distributed between anode connecting holes of two adjacent light-emitting units.

16. A light-emitting apparatus, comprising the light-emitting substrate according to claim 1.

17. A lighting apparatus, comprising the light-emitting substrate according to claim 1.

* * * * *